(12) United States Patent
Moura et al.

(10) Patent No.: US 10,997,828 B2
(45) Date of Patent: May 4, 2021

(54) SOUND GENERATION BASED ON VISUAL DATA

(71) Applicant: Accenture Global Solutions Limited, Dublin (IE)

(72) Inventors: Paulo Victor Moura, Recife (BR); Leonardo Correia Silva, Recife (BR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 132 days.

(21) Appl. No.: 16/537,199

(22) Filed: Aug. 9, 2019

(65) Prior Publication Data

US 2021/0043049 A1 Feb. 11, 2021

(51) Int. Cl.
| | |
|---|---|
| *G08B 1/00* | (2006.01) |
| *G08B 3/10* | (2006.01) |
| *G06T 7/70* | (2017.01) |
| *G06T 7/11* | (2017.01) |
| G09B 21/00 | (2006.01) |

(52) U.S. Cl.
CPC ............... *G08B 3/10* (2013.01); *G06T 7/11* (2017.01); *G06T 7/70* (2017.01); *G09B 21/006* (2013.01)

(58) Field of Classification Search
None
See application file for complete search history.

(56) References Cited

U.S. PATENT DOCUMENTS

| | | | | |
|---|---|---|---|---|
| 8,923,995 | B2 * | 12/2014 | Lindahl | G06F 3/167 |
| | | | | 700/94 |
| 2020/0120384 | A1 * | 4/2020 | Armaly | H04N 21/4532 |

\* cited by examiner

*Primary Examiner* — Julie B Lieu
(74) *Attorney, Agent, or Firm* — Jordan IP Law, LLC

(57) ABSTRACT

Systems, apparatuses, and methods are directed toward audio and visual mapping. A visual frame associated with an environment may be received. The visual frame may be segmented into a plurality of regions of interest. A first position for a first region of the plurality of regions of interest is determined. A determination may be made that the first position intersects with a projected area associated with a user. The projected area is to include one or more areas that are outside of a current direction of movement of the user. One or more characteristics of a first auditory stimulus are selected based on the first position and the determination that the first position is within the projected area.

20 Claims, 11 Drawing Sheets

SOUND GENERATION BASED ON VISUAL DATA

FIELD OF THE DISCLOSURE

This disclosure generally relates to methods, systems, apparatuses, and computer readable media for sound generation based on captured visual data.

BACKGROUND

Navigating complex and dynamic environments may be difficult, particularly in less than ideal conditions. For example, at night time a human being may have difficulty discerning objects in dark or dim conditions. Thus, navigating through a dark environment may become dangerous and/or difficult as the human being may not be able to recognize potentially dangerous situations, such as tripping over unrecognized objects or falling into unrecognized apertures. Further, visually impaired individuals may have difficulty navigating complex and dynamic changing environments.

SUMMARY

Consistent with the disclosure, exemplary embodiments of systems, apparatuses, and methods thereof for generating enhanced auditory stimuli, are disclosed.

According to an embodiment, an auditory output system, including a memory, and a processor coupled to the memory, wherein the processor is configured to receive a visual frame associated with an environment, segment the visual frame into a plurality of regions of interest, conduct a determination a first position for a first region of the plurality of regions of interest, determine that the first position intersects with a projected area associated with a user, wherein the projected area is to include one or more areas that are outside of a current direction of movement of the user, and select one or more characteristics of a first auditory stimulus based on the first position and the determination that the first position is within the projected area.

In an embodiment of the system, the one or more characteristics of the first auditory stimulus include one or more of a pitch, a length, a volume, a position or a texture.

In an embodiment of the system, the processor is configured to determine a second position for a second region from the plurality of regions of interest, and select one or more characteristics of a second auditory stimulus based on the second position, wherein the second auditory stimulus is different from the first auditory stimulus.

In an embodiment of the system, the processor is configured to calculate a first distance, wherein the first distance is one or more of a distance between the first region and the user or a distance between the auditory output system and the first region, calculate a second distance, wherein the second distance is one or more of a distance between the second region and the user or a distance between the auditory output system and the second region, determine whether the second distance is greater than the first distance, and if the second distance is greater than the first distance, trigger the first auditory stimulus to be output before the second auditory stimulus.

In an embodiment of the system, the processor is configured to generate a first label for the first region, and select the one or more characteristics of the first auditory stimulus based on the first label.

In an embodiment of the system, the processor is configured to receive a user input that indicates an objective, determine whether the first label corresponds to the objective, and select the one or more characteristics of the first auditory stimulus based on whether the first label corresponds to the objective.

In an embodiment of the system, the processor is configured to determine a second position for a second region from the plurality of regions of interest, receive a user input associated with an intended location, map a future path between the intended location and a current location of the user, conduct an identification that the second position is within a predetermined distance of the future path, and select one or more characteristics of a second audio stimulus based on the future path and the identification.

In an embodiment, a method includes receiving a visual frame associated with an environment, segmenting the visual frame into a plurality of regions of interest, determining a first position for a first region of the plurality of regions of interest, conducting a determination that the first position intersects with a projected area associated with a user, wherein the projected area is to include one or more areas that are outside of a current direction of movement of the user, and selecting one or more characteristics of a first auditory stimulus based on the first position and the and the determination that the first position is within the projected area.

In an embodiment of the method, the one or more characteristics of the first auditory stimulus include one or more of a pitch, a length, a volume, a position or a texture.

In an embodiment, the method may further include determining a second position for a second region from the plurality of regions of interest, and selecting one or more characteristics of a second auditory stimulus based on the second position, wherein the second auditory stimulus is different from the first auditory stimulus.

In an embodiment, the method may further include calculating a first distance, wherein the first distance is one or more of a distance between the first region and the user or a distance between an auditory output system and the first region, calculating a second distance between the second region and the user, wherein the second distance is one or more of a distance between the second region and the user or a distance between the auditory output system and the second region, determining whether the second distance is greater than the first distance, and if the second distance is greater than the first distance, triggering the first auditory stimulus to be output before the second auditory stimulus.

In an embodiment, the method may further include generating a first label for the first region, and selecting the one or more characteristics of the first auditory stimulus based on the first label.

In an embodiment, the method may further include receiving a user input that indicates an objective, determining whether the first label corresponds to the objective, and selecting the one or more characteristics of the first auditory stimulus based on whether the first label corresponds to the objective.

In an embodiment, a non-transitory computer readable medium includes a set of instructions, which when executed by one or more processors of a device, cause the one or more processors to receive a visual frame associated with an environment, segment the visual frame into a plurality of regions of interest, determine a first position for a first region of the plurality of regions of interest, conduct a determination that the first position intersects with a projected area associated with a user, wherein the projected area is to include one or more areas that are outside of a current direction of movement of the user, and select one or more characteristics of a first auditory stimulus based on the first position and the determination that the first position is within the projected area.

In an embodiment of the non-transitory computer readable medium, the one or more characteristics of the first auditory stimulus include one or more of a pitch, a length, a volume, a position or a texture.

In an embodiment of the non-transitory computer readable medium, the set of instructions, which when executed by the one or more processors, cause the one or more processors to determine a second position for a second region from the plurality of regions of interest, and select one or more characteristics of a second auditory stimulus based on the second position, wherein the second auditory stimulus is different from the first auditory stimulus.

In an embodiment of the non-transitory computer readable medium, the set of instructions, which when executed by the one or more processors, cause the one or more processors to calculate a first distance, wherein the first distance is one or more of a distance between the first region and the user or a distance between an auditory output system and the first region, calculate a second distance, wherein the second distance is one or more of a distance between the second region and the user or a distance between the auditory output system and the second region, determine whether the second distance is greater than the first distance, and if the second distance is greater than the first distance, trigger the first auditory stimulus to be output before the second auditory stimulus.

In an embodiment of the non-transitory computer readable medium, the set of instructions, which when executed by the one or more processors, cause the one or more processors to generate a first label for the first region, and select the one or more characteristics of the first auditory stimulus based on the first label.

In an embodiment of the non-transitory computer readable medium, the set of instructions, which when executed by the one or more processors, cause the one or more processors to receive a user input that indicates an objective, determine whether the first label corresponds to the objective, and select the one or more characteristics of the first auditory stimulus based on whether the first label corresponds to the objective.

In an embodiment of the non-transitory computer readable medium, the set of instructions, which when executed by the one or more processors, cause the one or more processors to determine a second position for a second region from the plurality of regions of interest, receive a user input associated with an intended location, map a future path between the intended location and a current location of the user, conduct an identification that the second position is within a predetermined distance of the future path, and select one or more characteristics of a second audio stimulus based on the future path and the identification.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

DESCRIPTION OF THE EMBODIMENTS

Figure 1:
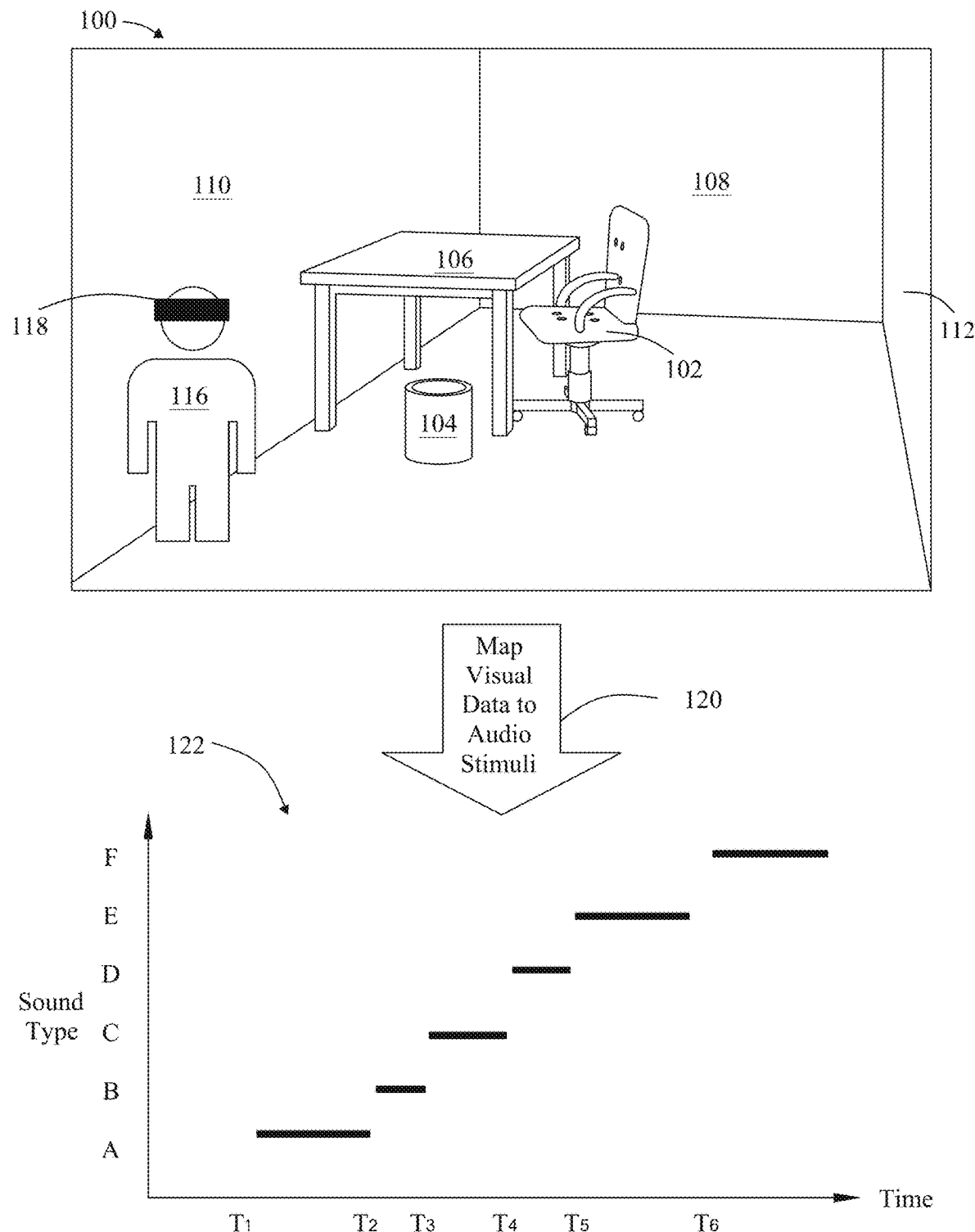
FIG. 1 shows a process to generate an auditory stimulus from a physical environment according to some exemplary embodiments.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Some embodiments may include an enhanced stimulus apparatus that simulates echolocation through an enhanced process that utilizes image recognition capabilities (e.g., camera and/or any type of imager, etc.) to generate an auditory layout of an environment to assist people to navigate spaces (e.g., indoor spaces). Some embodiments may generate a perception of a real-world environment surrounding a user through a translation of spatial information into audio stimulus through a multi-staged process (e.g., image acquisition, image semantic segmentation, space geometry estimation and 3D audio source virtual location estimation, etc.).

For example, in an augmented reality (AR) experience a real-world environment may be augmented by computer-generated perceptual information that may encompass several human senses, including sight and hearing. Thus, in some embodiments, the enhanced stimulus apparatus may include an enhanced AR architecture that may utilize a camera to obtain images, utilize one or more processors to transform the images into an audio stimuli (e.g., a series of sounds representing the images), and provide the audio stimuli to the user through an audio output device (e.g., speakers and/or headphones, etc.). In some embodiments, the enhanced stimulus apparatus may include a computer-readable medium that includes instructions, which when executed, cause a computing device to operate as described herein.

By generating an audio stimulus based on visual detection, visually impaired individuals and/or individuals in less than ideal environments may be able to comfortably navigate and maneuver. For example, a visually impaired user may need to reach a location (e.g., a bathroom) in an environment. There may be several objects in the environment. The enhanced stimulus apparatus may provide audio stimuli to identify not only objects that lie directly in front of the user and/or in a direct walking path of the user, but may also identify objects that are outside of a current direction of movement of the user and/or the walking path of the user (e.g., objects that lie to the left and right of the user). Moreover, the audio stimulus may identify various characteristics of the objects. For example, characteristics of the audio stimulus may be adjusted to indicate size, position, and depth of an object. Thus, based on the auditory stimuli of the environment, a user may accurately chart an ideal path to reach the bathroom. In contrast, other systems may only identify one object that lies directly in front of a user, thereby limiting the user's understanding of the environment.

The enhanced stimulus apparatus may result in several technical advantages, including enhanced mapping and auditory stimuli. Doing so may enhance efficiency, accuracy and add a rigorous, computerized process to perform tasks that were not previously performed by computing devices. For example, visually impaired individuals utilizing the enhanced stimulus apparatus may navigate complicated environments based not only on objects that lie directly in front of the impaired individuals, but also based on objects that lie on different sides of the user and at different depths. In contrast, a user relying on other methods (e.g., a white cane) to navigate the environment may only be able to detect objects that lie directly adjacent to the user (e.g., objects within a reaching distance of the white cane).

Thus, the enhanced stimulus apparatus may generate a more accurate audio mapping of a physical environment to enable a user to discern a layout of the environment. As such, a user may be able to accurately chart an entire path to an intended location based on areas distal to the user, rather than being limited to only understanding an area within reaching distance of the white cane. In doing so, the user may be able to determine a most efficient route to the intended destination. In some embodiments, the enhanced stimulus apparatus may generate the most efficient route and guide the user along the most efficient route through auditory stimulus.

Furthermore, the enhanced stimulus apparatus may reduce power consumption and include functionality that was previously unavailable on computing devices. For example, the enhanced stimulus apparatus may filter non-relevant objects from being represented in the auditory stimulus. A non-relevant object may be any object that is projected not to affect a user's walking path (e.g., an object on an elevated surface outside of the user's path, an object behind the user, etc.). Thus, the audio output device may output less sounds, thereby reducing power, increasing system speed during the process and enhancing efficiency. Further, the filtering may avoid information overload of a user to enhance the user's understanding of the environment.

In some embodiments, the enhanced stimulus apparatus may operate in conjunction with a cloud-based architecture. For example, the enhanced stimulus apparatus may provide an image to the cloud-based architecture through the internet, the cloud-based architecture may then map the image to audio stimulus, the cloud-based architecture may transmit the audio stimulus to the enhanced stimulus apparatus and the enhanced stimulus apparatus may provide the audio stimulus to the user through headphones or another auditory output. The distinction between what is executed by the enhanced stimulus apparatus and the cloud may be flexible according to processing power of the enhanced stimulus apparatus and operational requirements. Thus, while an enhanced stimulus apparatus is described below and executes several operations, it will be understood that the operations described herein may instead be executed by a cloud-based architecture depending on system requirements.

FIG. 1 shows a process 100 to generate an auditory stimulus from a physical environment. The user 116 may be visually impaired and/or the lighting in the environment may be insufficient for the user 116 to visually process the environment. The environment may include several objects including three walls 108, 110, 112, a waste bin 104, a table 106 and chair 102. The objects may be different distances from the user 116.

The user 116 may utilize an auditory output system 118. The auditory output system 118 may receive a visual frame associated with the environment. In some embodiments, the auditory output system 118 may enhance the visual frame using various techniques (e.g., low-light image enhancement, filtering with morphological operators, histogram equalization, noise removal using a Wiener filter, linear contrast adjustment, median filtering, unsharp mask filtering, contrast-limited adaptive histogram equalization, decorrelation stretch, etc.).

The auditory output system 118 may employ image recognition techniques to identify different types of objects in the visual frame, and the outlines of the object. Based on the image recognition, the auditory output system 118 may segment the visual frame into a plurality of regions of interest to represent each of the objects. Each region of interest may approximate the size, shape and type of object represented by the region of interest. So for example, a first wall 108 may be represented by a first region of interest, a second wall 110 may be represented by a second region of interest, a third wall 112 may be represented by a third region of interest, the waste bin 104 may be represented by a fourth region of interest, the table 106 may be represented by a fifth region of interest and the chair 102 may be represented by a sixth region of interest. Each particular region of the first-sixth regions of interest may have a size that is proportional to a size of the object that the particular region represents. So for example the first region that represents the first wall 108 may have a larger size than a size of the fourth region of interest that represents the waste bin 104.

A unique color may be assigned to each type of object. During image recognition, the auditory output system 118 may categorize each of the objects. The auditory output system 118 may assign unique colors to the first-sixth regions of interest based on the categorization. For example, the auditory output system 118 may include a look up table of categories of objects and unique colors assigned to the categories. That is, each category may be assigned one unique color. The auditory output system 118 may identify each of the objects, categorize each of the objects, reference the lookup table to identify the unique colors assigned to the categories of the objects and assign the identified unique colors to the first-sixth regions of interest of the categorized objects.

As a more detailed example, a lookup table may have the following form in which the first, second, third and fourth colors are different from each other:

TABLE I

| Category | Color |
|---|---|
| Chair | First Color |
| Wall | Second Color |
| Table | Third Color |
| Waste Bin | Fourth Color |

The auditory output system 118 may categorize the first wall 108 as being a "Wall." The auditory output system 118 may then access the lookup table to determine the color that is assigned to the Wall category, which is the "Second Color." The auditory output system 118 may thus assign the Second Color to the first region of interest that represents the first wall 108. Likewise, the auditory output system 118 may categorize the second and third walls 110, 112 as each being a "Wall." The auditory output system 118 may then access the lookup table to determine the color that is assigned to the Wall Category, which is the "Second Color." The auditory output system 118 may thus assign the Second Color to each of the second and third regions of interest that represent the second and third walls 110, 112.

Similarly, the auditory output system 118 may categorize the waste bin 104 as being a "Waste Bin." The auditory output system 118 may then access the lookup table to determine the color that is assigned to the Waste Bin Category, which is the "Fourth Color." The auditory output system 118 may thus assign the Fourth Color to the fourth region of interest that represents the waste bin 104. Likewise, the auditory output system 118 may assign the First Color to the sixth region of interest that represents the chair 102, and assign the Third Color to the a fifth region of interest that represents the table 106. The assigned colors may be used to determine qualities (e.g., pitch, volume, position, duration or texture) of sounds that represent the first-sixth regions of interest. In some embodiments, the first-sixth regions of interest do not need to be colored, and the qualities of the sounds are determined based on the categorizations of the first-sixth regions.

The auditory output system 118 may determine the positions of the first-sixth regions of interest relative to the user 116. For example, the auditory output system 118 may determine the shortest distances between the user 116 and the first-sixth regions of interest. In doing so, the auditory output system 118 may determine which of the first-sixth regions of interest may be most important to the user 116.

Furthermore, the auditory output system 118 not only identifies objects that are directly in front of a user or a current direction of movement of the user, but are also outside of a current direction of movement of the user 116. For example, the auditory output system 118 may identify that the user is currently moving along a direction. The auditory output system 118 may identify objects that are outside of the direction. The auditory output system 118 may also identify objects that are along the direction so that the user 116 may have an auditory mapping the environment.

The auditory output system 118 may then execute a process to map the visual data to audio stimuli 120. In the present example, the audio stimuli may include several different sound types A-F (e.g., binaural and/or 3D sounds). The sound types A-F may be generated to represent the different objects as shown by graph 122. The sound types A-F may be determined based at least on characteristics of the first-sixth regions of interest, such as sizes, colors and/or categorizations. The sound types A-F may differ from each other with respect to one or more characteristics including one or more of order, pitch, volume, position, duration or texture. The audio stimuli may be provided to the user 116 through any auditory output device and/or system (e.g., speakers, headphones, etc.). As is described below, one or more characteristics of the sound types A-F are selected based on characteristics of the objects and/or first-sixth regions of interests.

In the present example, the sound types A-F may have durations that are proportional to the sizes of the first-sixth regions of interest, and hence proportional to the sizes of the three walls 108, 110, 112, the waste bin 104, the table 106 and the chair 102. A "duration" of a sound type from the sound types A-F may mean a total length of time that the sound type is presented to the user 116 or played.

In the present example, the sound types A-F are presented to the user 116 based on the shortest distances determined above. For example, the first-sixth regions of interest may be sorted in order from smallest to greatest shortest distance and sound types A-F, that represent the first-sixth regions of interest, may be presented in the sorted order.

In the present example, sound type A may be presented to the user 116 at time $T_1$. Sound type A may represent the second wall 110 and has a longer duration relative to other sound types B, C, D as will be explained below. The sound type A may be presented first from the sound types A-F since the second wall 110 is closest to the user 116 out of the objects and the sound type A represents the second wall 110.

Sound type A may complete at time $T_2$ at which time sound type B may be presented to the user 116 for a shorter duration. Sound type B may represent the waste bin 104. The waste bin 104 may be the second closest object to the user 116, so the sound type B is presented second out of sound types A-F. Since the waste bin 104 is relatively small and has the fourth region of interest is small, the auditory output system 118 may determine that the duration of the sound type B should be shorter than sound type A. That is, sound type B is shorter than sound type A since the waste bin 104 is smaller than the second wall 110.

At time $T_3$, sound type B ceases and sound type C begins. Sound type C may represent the table 106. The table 106 may be the third closest object to the user 116, so the sound type C is presented third. The length of sound type C is proportional to the size of the fifth region of interest of the table 106, and is therefore shorter than sound type A but longer than sound type B. At time $T_4$, sound type C ceases and sound type D begins. Sound type D may represent the chair 102. The chair 102 may be the fourth closest object to the user 116, so the sound type D is presented fourth. The length of sound type D is proportional to the size of the sixth region of interest of the chair 102, and is therefore shorter than sound types A and C, but longer than sound type B.

At time $T_5$, sound type D ceases and sound type E begins. Sound type E may represent the third wall 112. The third wall 112 may be the fifth closest object to the user 116, so the sound type E is presented fifth. The length of sound type E is proportional to the size of the third region of interest of the third wall 112, and is therefore equal to sound type A, and longer than sound types B-D. At time $T_6$, sound type E ceases and sound type F begins. Sound type F may represent the wall 108. The wall 108 may be the distal most object relative to the user 116, so the sound type F is presented last. The length of sound type F is proportional to the size of the first region of interest of the wall 108, and is therefore equal to sound types A and E, and longer than sound types B-D.

As illustrated, the sound types A-F are presented sequentially to the user 116 so that the user 116 does not experience a blending of the sound types A-F and may distinctly focus on each of the sound types A-F individually. In some embodiments, some of the sound types A-F may be presented concurrently if the associated first-sixth regions of interests overlap each other or are proximate to each other.

In some embodiments, characteristics of the sound types A-F may be selected to reflect an approximate depth and/or distance from the user 116. For example, a tone or a pitch may be adjusted based on the approximate distance from the user 116. For example, as the approximate depth or distance of an object relative to the user 116 increases, the tone representing the object may become higher pitched and/or have lower volume.

In some embodiments, two or more of the first-sixth regions of interest may be grouped together based on proximity. For example, two or more of the first-sixth regions of interest may essentially overlap with each other from the perspective of the user 116. As a more detailed example, the user 116 may not be able to navigate through the chair 102, waste bin 10 and table 106. As such, one region of interest may be utilized to represent the chair 102, the waste bin 104 and the table 106 so that one sound is output to the user 116 to represent the chair 102, the waste bin 104 and the table 106. In such instances, the chair 102, the waste bin 104 and the table 106 may be categorized as being a broad object type such as "office equipment," and the one region of interest may be colored accordingly.

In some embodiments, the sounds A-F may also be adjusted based on whether an object is on the left side, right side or in front of the user 116. For example, objects that are on a left side of the user 116 (e.g., outside of a current direction of movement of the user) may have sounds that are played through only the left speaker or the left headphone, objects that are on the right side of the user 116 (e.g., outside of a current direction of movement of the user) may have sounds that are played only through the right speaker or right headphone, and objects that are in front of the user 116 may be played through both the left and right headphones or speakers. In some embodiments, the sound placement may be dynamically modified if an object is both in front of and to a side of the user 116. For example, the table 106 may be both in front of and to the right side of the user 116. So sound type C, which represents the table 106, may initially be played through the left and right headphones, and then transition to only being played through the right headphone to identify the position of the table 106 relative to the user 116.

In some embodiments, the sounds A-F may also be adjusted based on the categorizations of objects as indicated by the colors assigned to the first-sixth regions of interest. For example, the auditory output system 118 may assign a unique sound texture to each sound type A-F based on the color of the associated first-sixth region of interest. That is, a unique sound texture may be assigned each color and/or category. The auditory output system 118 may identify the colors of the first-sixth regions of interest, and assign sound textures to the sound types A-F based on the colors.

For example, a first sound texture may be assigned to the chair category and/or the first color. The auditory output system 118 may identify that the color of the sixth region of interest of the chair 102 is the first color. The auditory output system 118 may then determine that the first color is associated with first sound texture, and accordingly assign the first sound texture to sound type D which represents the sixth region of interest. In contrast, a second sound texture may be assigned to the wall category and/or the second color. The auditory output system 118 may identify that the color of the first region of interest of the first wall 108 is the second color. The auditory output system 118 may then determine that the second color is associated with the second sound texture, and accordingly assign the second sound texture to sound type F which represents the first region of interest. Likewise, the second sound texture may be assigned to sound types A and E that represent the first and third walls respectively. Thus, unique sound textures may be assigned to each of the sound types A-F. In some embodiments, the first-sixth regions of interest do not need to be colored, and the sound textures of the sounds are determined based on the categorizations of the first-sixth regions.

In some embodiments, the user 116 may be able to set a target goal and/or destination such as reach the chair 102. In such embodiments, the auditory output system 118 may filter the first-sixth regions of interest so as to present the user 116 with only relevant sounds, such as sounds A-D that represent the second wall 110, chair 102, the waste bin 104 and the table 106, while omitting the first and third walls 108, 112. For example, the auditory output system 118 may identify a likely path that the user 116 may take to reach the chair 102 and exclude one or more objects from being represented in audio stimuli to the user 116 when the one or more objects are not proximate to the path.

As described above, sounds A-F may be presented to the user 116. That is, the enhanced auditory output system 118 does not just provide an audio stimuli to identify objects that are directly in front of the user 116 or lie in a direct path of movement of the user 116. Rather, the enhanced auditory output system 118 presents several sounds which may not intersect with the path of the user 116. For example, the chair 102 may be represented by sound type D and is located on a right side of the user 116 rather than directly in front of the user 116. Based on the above, the sound type D may be played through only the right speaker, have a unique texture associated with chairs, and played for a specific duration at time $T_4$. Thus, the user 116 may be able to more accurately identify objects in the environment and plan a route to a destination. Moreover, the user 116 may have an enhanced understanding of each object. For example, based on each of sound types A-F, the user 116 may be able to identify an approximate location of the associated object, distance of the associated object from the user 116, the associated object type and a size of the associated object.

In some embodiments, the auditory output system 118 may include at least an imaging device (e.g., camera), a processor and an auditory output (e.g., headphones). In some embodiments, the auditory output system 118 is an augmented and/or virtual reality system that includes a cellular phone, headset to hold the cellular phone proximate the eyes of the user 116 and headphones connected to the cellular phone. The cellular phone may include a camera to image the environment. In some embodiments, the headset not only holds the cellular device, but may also execute some or all of the process 100 described above. In some embodiments, the cellular device may execute some or all of the process 100. In some embodiments, the cellular device and/or headset may communicate with servers (cloud based systems) to process and execute the process 100.

In some embodiments, the regions of interest may be categorized without adding color to the regions of interest. In such embodiments, the processes described above would operate based on the categorization rather than colors.

Each of the process 100 and/or methods described herein may be implemented in hardware, in software, or in some combination thereof. For example, each of the method blocks described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 2:
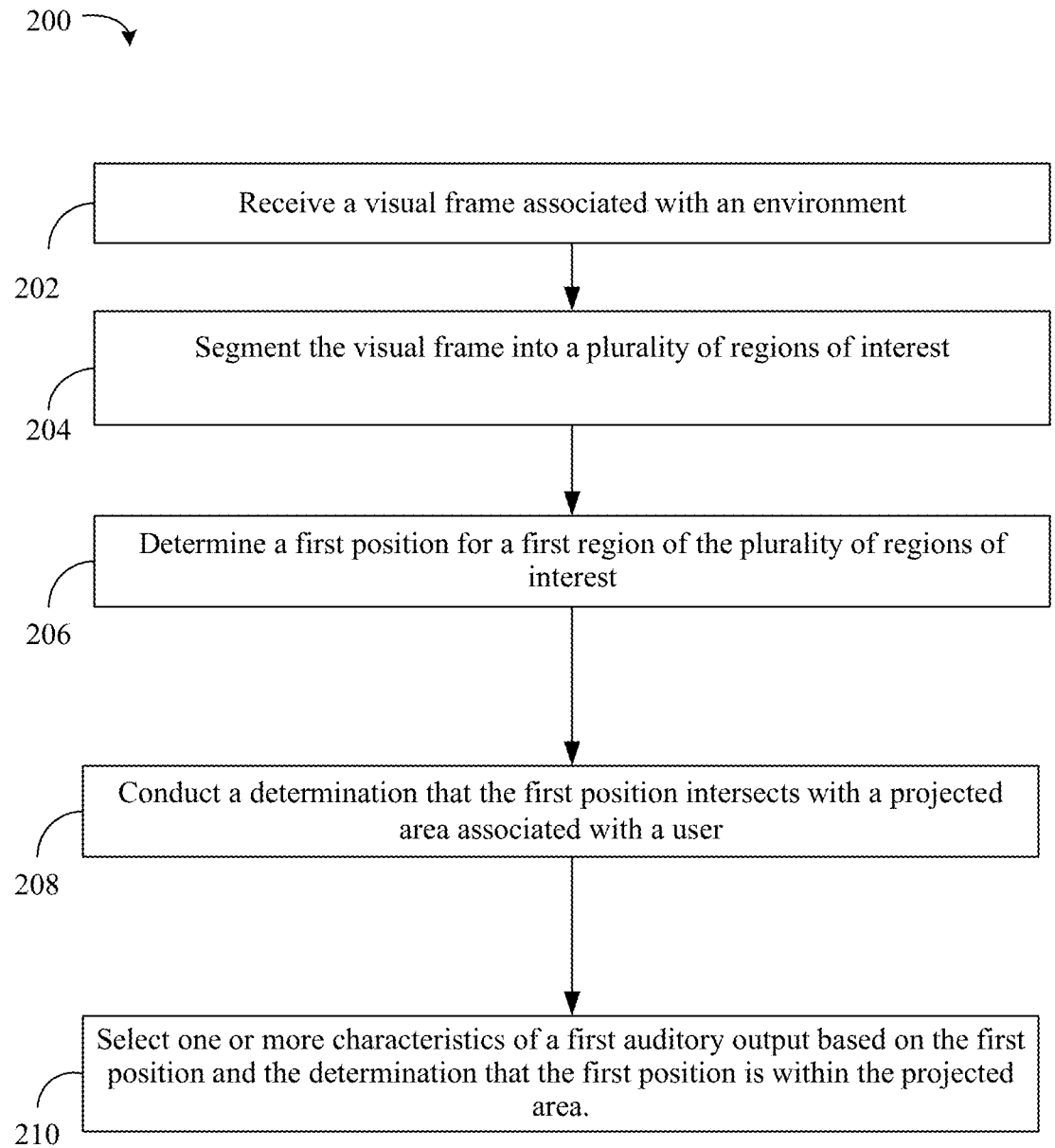
FIG. 2 illustrates a method of generating audio stimuli from a visual frame according to some exemplary embodiments.

FIG. 2 illustrates a method 200 of generating audio stimuli from a visual frame. Processing block 202 may receive a visual frame associated with an environment. Processing block 204 may segment the visual frame into a plurality of regions of interest. Processing block 206 may determine a first position for a first region of the plurality of regions of interest. Processing block 208 may conduct a determination that the first position intersects with a projected area associated with a user. The projected area may include one or more areas that are outside of a current direction of movement of the user. Processing block 210 may select one or more characteristics of a first auditory stimulus based on the first position and the determination that the first position is within the projected area.

Figure 3A:
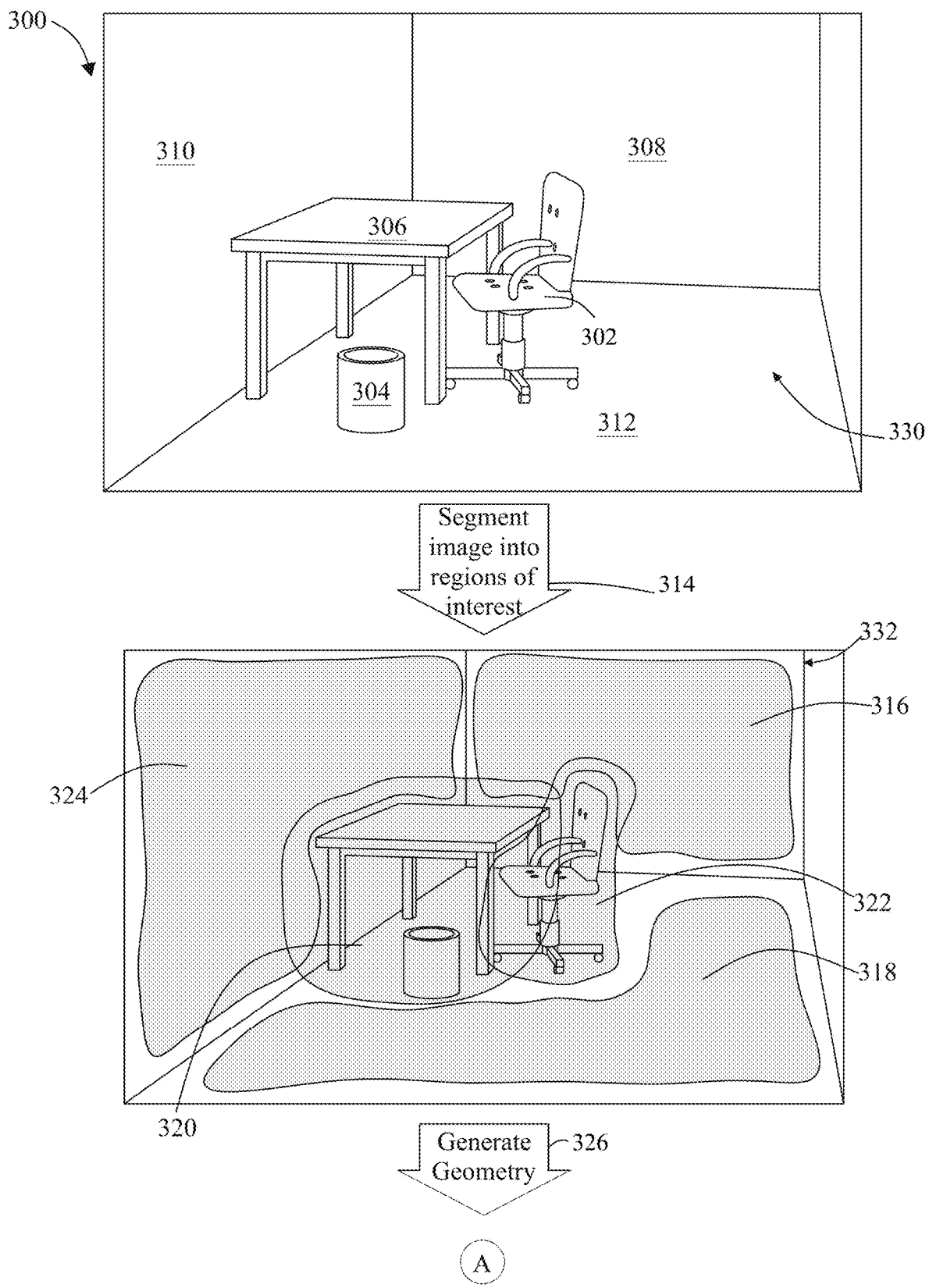
FIGS. 3A and 3B illustrate a process to generate audio stimuli from a visual frame of an environment according to some exemplary embodiments.
Figure 3B:
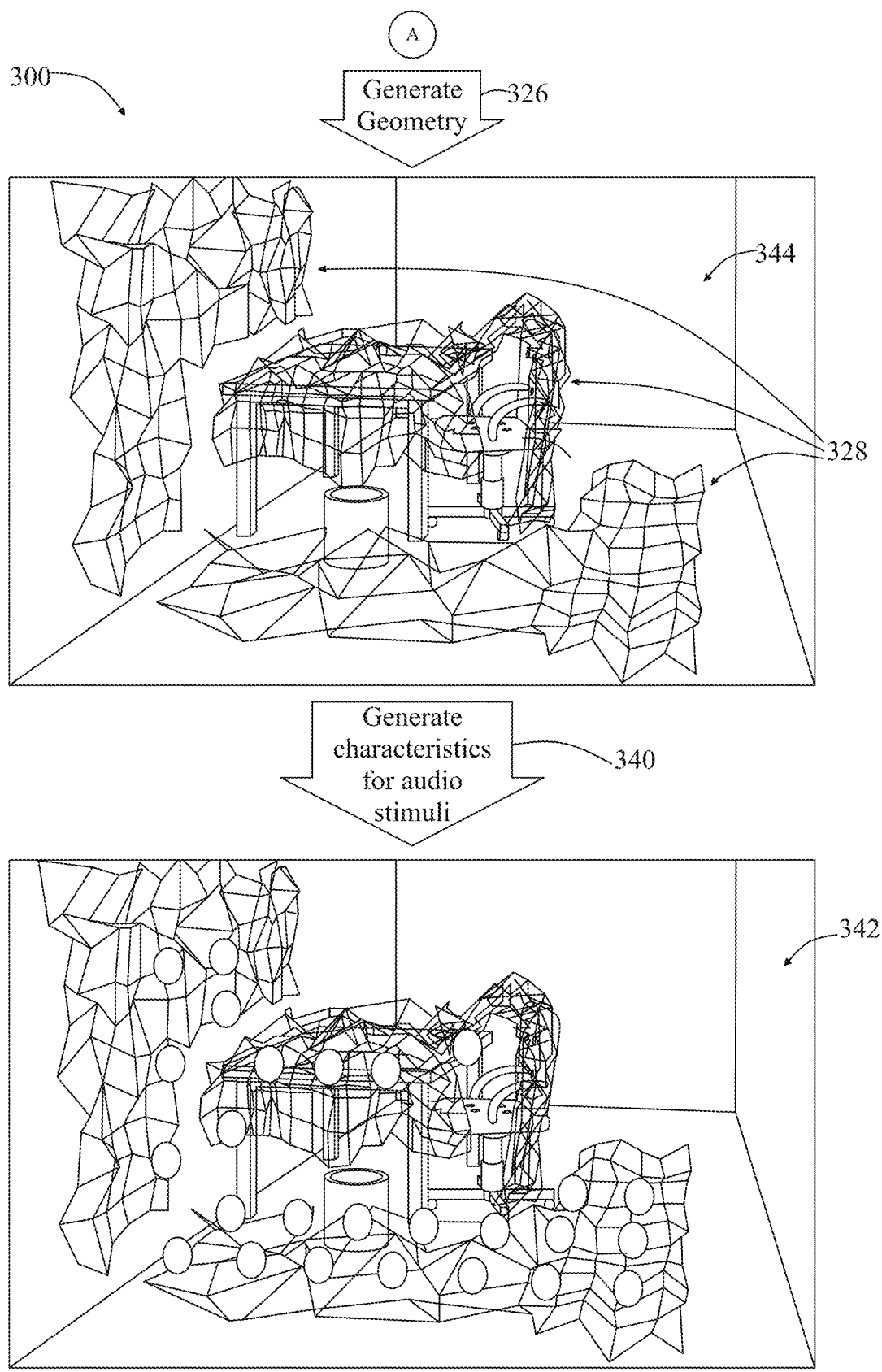

FIGS. 3A and 3B illustrate a process 300 to generate audio stimuli from a visual frame of an environment. In some embodiments, the process 300 may be implemented in an auditory output system to assist people with visual impairment and/or people in poor environment conditions to navigate indoor and/or outdoor spaces. In some embodiments, portions of the process 300 are implemented in a cloud environment that communicates with an auditory output system.

In some embodiments, the auditory output system generates an AR experience that includes a real-world environment augmented by computer-generated perceptual information that may encompass most, if not all, the ranges of human senses. In some embodiments, process 300 may generate a perception of a space surrounding the user wearing a headset possessing an AR architecture, using the AR architecture's camera to translate the spatial information into audio stimuli through a multi-staged process comprised of image acquisition, image semantic segmentation, space geometry estimation and 3D audio source virtual location estimation.

Process 300 may first capture an image 330. In some embodiments, frames (e.g., images) may be fed down into the process 300 at pre-determined intervals, such as every $\frac{1}{15}$ of a second. The image 330 may include several objects, including a first wall 310, second wall 308, floor 312, a waste bin 304, table 306 and chair 302.

The process 300 may segment the image 330 into regions of interest 314 to generate a segmented image 332. Five regions of interest 316, 318, 320, 322, 324 may be identified. Region of interest 324 may represent the first wall 310, region of interest 316 may represent the second wall 308, region of interest 320 may represent the table 306, region of interest 322 may represent the chair 302 and region of interest 318 may represent the floor 312. Process 300 may utilize image recognition techniques to identify the regions of interest 316, 318, 320, 322, 324.

In some embodiments, a Convolutional Neural Network (CNN) may be trained with a dataset for different categories. In some examples, the CNN may be trained to identify objects that fall into one of the following categories: wall, floor, ceiling, doorway, table, chair, monitor, couch and person. Computer Vision techniques may also be used to discriminate first and second walls 310, 308 and the floor 312. Based on the categorization of the CNN, the regions of interest 316, 318, 320, 322, 324 may be generated as colored, low resolution bitmap masks. That is, the regions of interest 316, 318, 320, 322, 324 may be color coded to a segmented category (e.g., chair category, wall category, floor category, etc.) which may be later used to map a different sound texture to an audio source. The regions of interest 316, 318, 320, 322, 324 may form part of a metadata analysis that is used later by process 300. Thus, each of the regions of interest 316, 318, 320, 322, 324 may be categorized and then colored based on the categorization.

Process 300 may then generate geometry 326 as illustrated in FIG. 3B. As illustrated, to generate the geometry 326, the process 300 forms a polygon mesh 328 on modified image 344 to estimate the geometries of the of the underlying environment. For example, a library may be employed to generate an evolutive triangle mesh constituted of a 3D point cloud which approaches a topology of the environment of the image 330 captured by the camera. In some embodiments, the process 300 generates the geometry 326 based on the originally captured image 330. In some embodiments, the process 300 uses the segmented image 332 to generate the geometry 326. The generated geometry, including the polygon mesh 328, may form part of the metadata analysis.

Process 300 may then generate characteristics for audio stimuli 340 based on the metadata analysis described above. In particular, the metadata analysis generated in the previous actions of the process 300 are used to render a final auditory experience.

Positions of potential audio sources are illustrated by circles as shown in image 342. The audio sources may be sounds that are mapped to physical objects and/or areas. Image 342 may be generated from modified image 344. To generate the positions of the audio sources, process 300 may align the virtual space with the real space which is discretized into virtual cubes. The position of an audio source may be an area that the audio source is to represent (e.g., the chair). The virtual cubes may be of various lengths (e.g., 24 cm) where 3D points of the polygon mesh 328 reside. In some embodiments, it may be possible to further discretize the virtual cubes by placing the virtual cubes into larger virtual cubes that may be referred to as "chunks." Each chunk may be comprised of one or more virtual cubes or a plurality of virtual cubes. The circles of image 342 may show positions of the audio sources (e.g., points within the chunks) that fall within the polygon mesh 328. In some embodiments, only one audio source is positioned on each chunk.

Combining the virtual cubes into chunks may reduce the number of sound sources in order to not overwhelm the user with too much sound stimulus. In some embodiments, the way to combine the virtual cubes may rely on a density of virtual cubes in a given area. Using the Euclidean distances between the cubes it possible to create clusters of virtual cubes. When a cluster reaches a predefined threshold the virtual cubes in that cluster are combined in larger virtual cube. The threshold to combine the virtual cubes into chunks may be a function based on two parameters: the maximum Euclidean distance (mED) and a minimum number of virtual cubes (mVC). So when the method 300 identifies a cluster of virtual cubes that satisfies these two parameters (average Euclidean distance between all the virtual cubes in the cluster is less than mED and the number of cubes in the cluster is greater than mVC) the virtual cubes are combined into a chunk.

The process 300 may further determine all the chunks which collide with a frustum to determine a subset of the potential audio sources that will be represented in the audio stimuli. The subset may be referred to as "final audio sources." The frustum may be a spatial data structure that represents an intended walking path and/or viewing area of the user, as well as some areas to the sides of the intended walking path and/or viewing area to account for deviations. In some embodiments, the frustum may be an area that is in front of and to the lateral sides of the user. The frustum may resemble a trapezoid. Using a frustum and larger sized chunks enhances efficiency and speed to determine the final audio sources that will be presented to the user.

In some embodiments, in conjunction with or in place of the frustum associated process described above, the process 300 may determine the final audio sources based on constants. For example, a "Listener Radius" may be a maximum linear distance (e.g., 3.5 meters) from the user where an audio source will be of any interest to the user. Thus, even if an audio source intersects with the frustum, the audio source may be excluded if the audio source is outside of the Listener Radius. In some embodiments, the Listener Radius may be a dynamically adjustable variable that is adjusted based on a speed of the user. For example, as the user moves more quickly, the Listener Radius may increase. As the user moves mores slowly, the Listener Radius may decrease.

In some embodiments, the Listener Radius is determined in such a way to include audio sources that may be reached within a time period based on the user's current speed or velocity. For example, the user's speed may be multiplied by the time period (e.g., 2 seconds) to determine a distance that the user may move. The distance may be set as the "Listener Radius." As an example, if at a current speed, the user is projected to reach 3 meters in the next 2 seconds, then audio sources within 3 meters of the user may be represented in the audio stimuli, while audio sources outside 3 meters of the user may be discarded from representation in the audio stimuli.

The final audio sources may have associated dynamic characteristics (e.g., pitch, volume, position, duration and texture) that influence the richness of the user experience. In some embodiments, the dynamic characteristics of the final audio sources may be modulated according to a device that executes the process 300 and/or is associated with the user. For example, the process 300 may modify the dynamic characteristics based on the device's virtual distance and orientation with respect to the audio sources.

In some embodiments, the process 300 may further implement audio full-spheric surround sound, giving the final audio sources three dimensionality by playing various sounds to represent the audio sources. The process 300 may also adjust a timing characteristic of the final audio sources to delay and space apart the final audio sources in a way that reduces blending, auditory loss and enhances the depth perception.

A "Maximum Pitch Variance" may determine how much the pitch of the subset of audio sources changes with respect to a variable called "Listener Distance." The "Listener Distance" may be a Euclidian Distance calculated from the user to a 3D point of the respective audio source. For example, as the Listener Distance increases, the pitch may increase. A variable called "Maximum Delay" indicates how much an audio source will be delayed in a linear relationship to the Listener Distance. For example, as the Listener Distance increases, Maximum Delay may increase. Both the "Maximum Pitch Variance" and the "Maximum Delay" may be adjusted based on the user's speed and/or velocity.

In some embodiments, the process 300 may be repeated to update the user. In some embodiments, the process 300 may be repeated at predetermined intervals and/or every time the user moves a predetermined distance. Furthermore, the final audio sources may be presented to the user with the modified dynamic characteristics described above.

In some embodiments, one or more portions of the process 300 may be executed in the cloud (e.g., servers remote to the audio stimulus apparatus). For example, an audio stimulus apparatus may provide the image 330 to the cloud through the internet. The cloud may in turn execute one or more of segmenting the image into regions of interest 314, generating geometry 326, and generating characteristics for audio stimuli 340. The audio stimulus apparatus may output the audio stimuli to the user.

Figure 4:
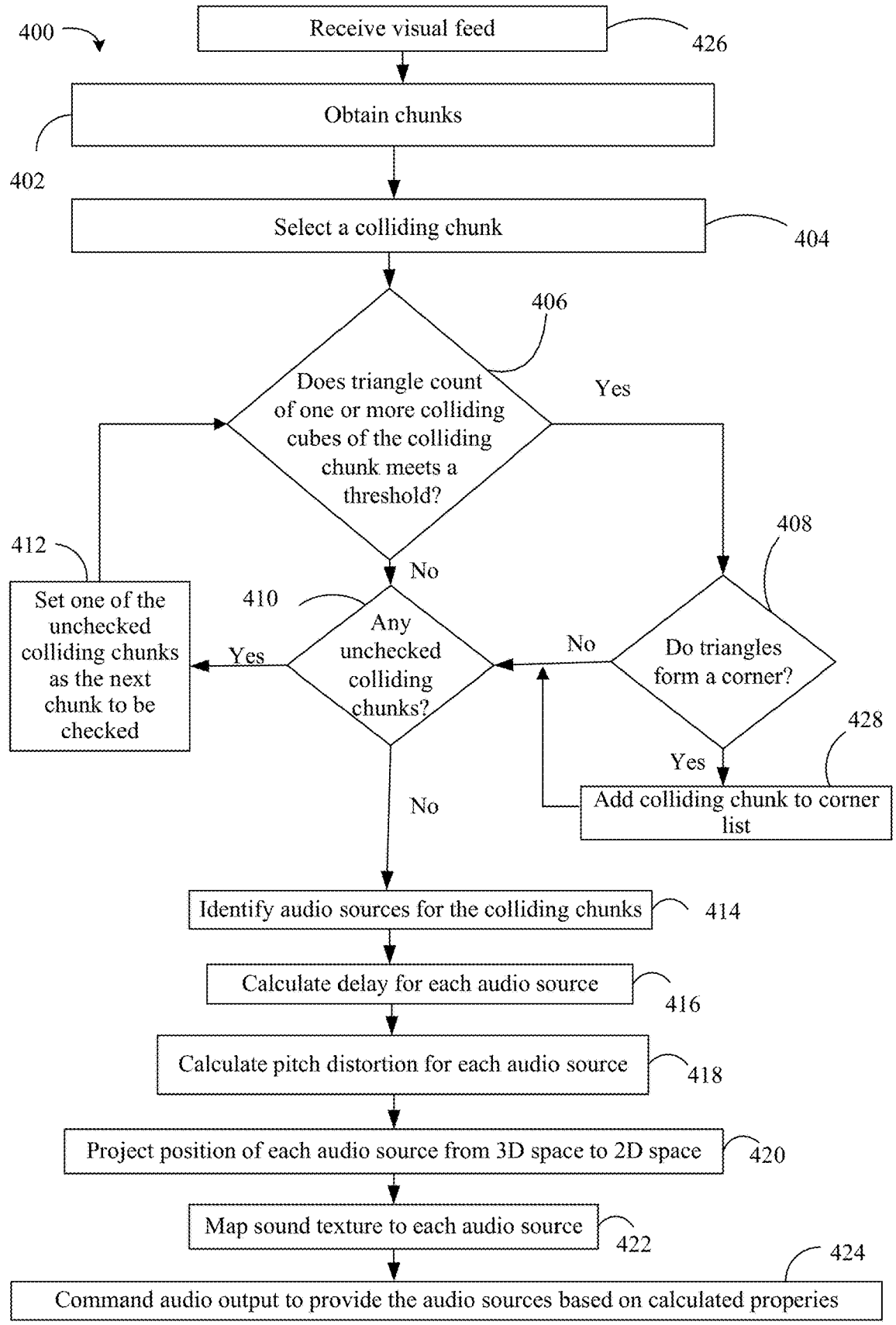
FIG. 4 illustrates a method of generating audio sources according to some exemplary embodiments.

FIG. 4 illustrates a method 400 of generating audio sources. Processing block 426 may receive a visual feed. Processing block 402 obtains chunks. In some embodiments, the chunks include only those chunks that collide with a user associated frustum and/or are within a Listener Radius. Obtaining chunks that collide with the user associated frustum and/or Listener Radius has been described herein, for example with respect to FIG. 3. Processing block 404 may select a colliding chunk that is not yet checked. Processing block 406 may check if a triangle count of one or more colliding cubes of the colliding chunk meets a threshold. In some embodiments, other polygons may be used instead of triangles. The colliding chunk may include only one cube, or may include a plurality of cubes. Some embodiments may include checking if a total triangle count of all cubes that form the colliding chunk are greater than the threshold. If so, processing block 408 identifies whether a corner is formed by the triangles. For example, if the slopes of the triangles exhibit a large difference, then a corner may be formed. In particular, if one of the triangles has a slope of 0 degrees, and another of the triangles has a slope of 90 degrees, it may be inferred that a corner is formed in the colliding chunk. Some embodiments may identify whether a sudden change in slope of adjacent triangles occurs, and if so, identify that the triangles form a corner. In some embodiments, a difference between the slopes of the triangles are compared to a threshold, and if the threshold is met by the difference the triangles' colliding chunk is deemed to have formed a corner.

If the triangles form a corner, processing block 428 may add the colliding chunk to a corner list and proceed to block 410. If the triangles do not form a corner, processing block 410 may check whether any unchecked colliding chunks remain. If so, processing block 412 sets one of the unchecked colliding chunks as the next chunk to be checked and processing block 406 may repeat on the next unchecked colliding chunk.

Thus, the processing blocks 406, 408, 428, 410, 412 may repeat until all colliding chunks are checked for corners. When processing block 410 identifies that there are no unchecked colliding chunks, processing block 414 may identify audio sources for the colliding chunks. For example, processing block 414 may check, for each colliding chunk of the corner list to determine whether multiple audio sources should be positioned in the colliding chunk (e.g., at perpendicular sides of a corner or at areas that on each side of the corner). For each colliding chunk that is not in the corner list, processing block 414 may add an audio source having a position on the colliding chunk.

Processing block 416 may calculate a delay for each audio source generated by block 414. For example, the delay for each colliding chunk may be calculated according to the equation:

$$\text{Delay} = \text{Normalize}(\text{Distance to User}) * \text{MaxDelay} \quad \text{Equation 1}$$

The delays may be different from one another based on a distance between the user and the respective colliding chunk. "MaxDelay" may be a constant.

Processing block 418 may calculate a pitch distortion for each audio source. For example, the pitch distortion may be calculated according to the following equation:

$$\text{Pitch Distortion} = (1 - \text{Normalize}(\text{Distance To Agent})) * \text{MaxPitch Distortion} \quad \text{Equation 2}$$

The pitch distortions may be different from one another based on a distance between the user and the respective colliding chunk represented by the audio source. "MaxPitchDistortion" may be a constant.

Processing block 420 may project a position of each audio source from 3D space to 2D space. Doing so may allow a better audio projection. Processing block 422 may map a sound texture to each audio source. For example, block 422 may access a segmented image, that includes regions of interest as described above, to map a sound texture with respect to a pixel color of the regions of interest. For example, if a colliding chunk intersects a particular region of interest, a texture associated with a color of the particular region of interest (e.g., a chair category color, person category color, etc.), may be assigned to an audio source of the colliding chunk. The color may in turn be used to determine a sound texture. Block 424 may command an audio output to provide the audio sources based on the calculated properties described above.

Figure 5:
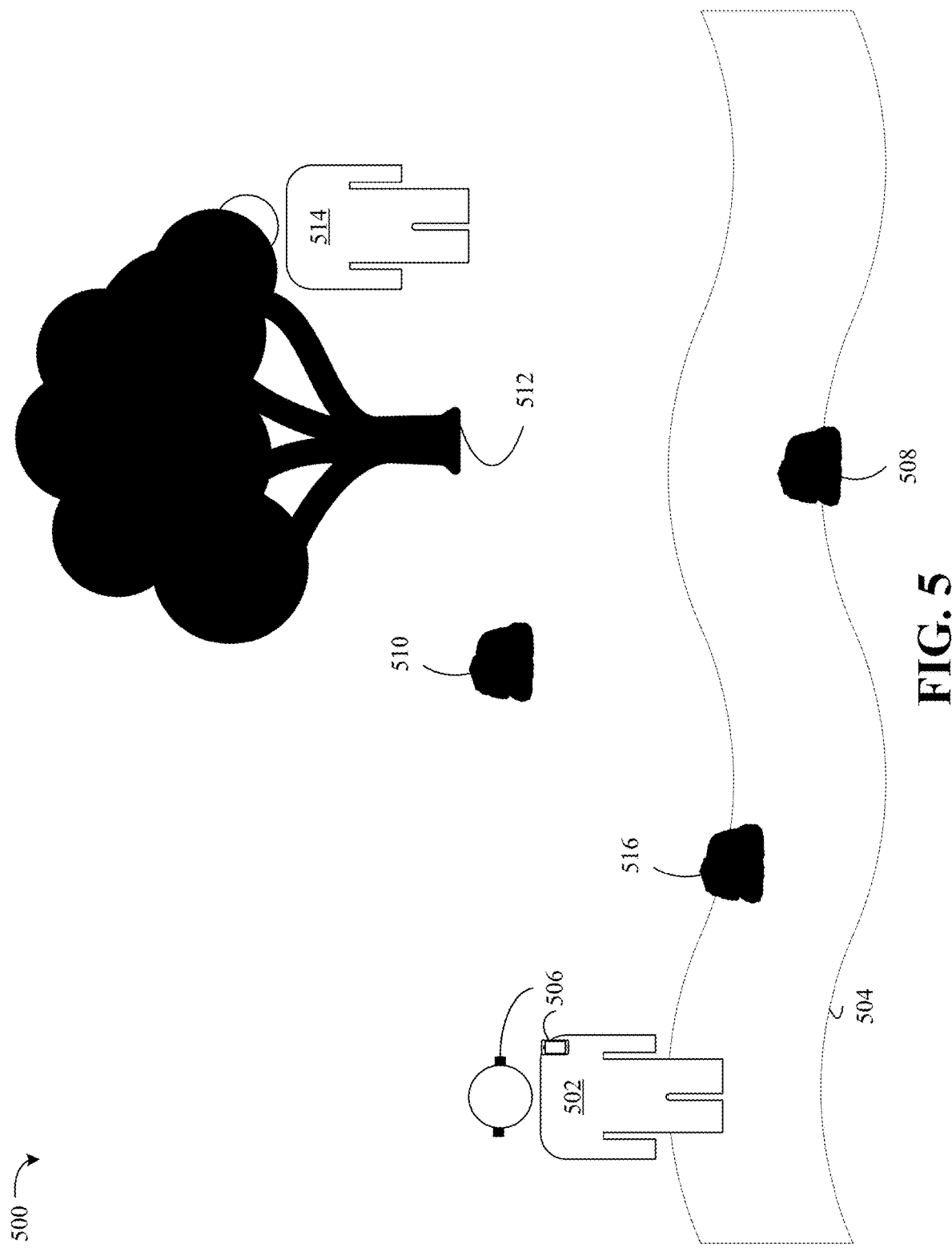
FIG. 5 illustrates a scenario in which a user is navigating an environment with an auditory output system according to some exemplary embodiments.

FIG. 5 illustrates a scenario in which a user is navigating an environment 500 with an auditory output system 506. The auditory output system 506 may include a cellular device and headphones. The user 502 may wear the auditory output system 506 and move along path 504. As the user 502 moves, the auditory output system 506 may process the surroundings as described above to provide the user with audio stimuli based on images captured from the cellular device. The audio stimuli may be provided to the user through the headphones. For example, the audio stimuli may include a first sound type for a first rock 516 and a second sound type for a second rock 508.

The auditory output system 506 may not provide a third rock 510 as part of the audio stimuli. For example, the auditory output system 506 may determine that the rock 510 is outside of a frustum and/or a predetermined radius of the user 502 and/or the auditory output system 506 and is therefore to be excluded from the audio stimuli.

The auditory output system 506 may identify a human being 514 behind a tree 512. The auditory output system 506 may determine that the human being 514 may be a potential threat to the user 502 (inflict physical harm and/or damage), as described below. As such, even though the human being 514 is behind the tree 512, the auditory output system 506 may generate the audio stimuli to include a third sound to identify the human being 514.

In some embodiments, the auditory output system 506 may further analyze characteristics of the human being 514 to identify suspicious behavior and select one or more characteristics of the third sound to reflect as much. For example, the auditory output system 506 may identify whether the human being 514 exhibits any physical characteristics and/or behaviors which indicate an intent to harm the user 502, such as brandishing a weapon (e.g., a knife, gun, etc.), wearing concealing attire (e.g., facial mask, hoodie, other garments that obscure the face, gloves, etc.), or physical positions (e.g., clenched fists, menacing postures, etc.) to indicate an attack to the user 502 may occur. In some embodiments, if the human being 514 begins moving towards the user 502, the auditory output system 506 may modify the third sound to reflect as much with a unique warning (e.g., an intermittent loud beep with modified textures and/or verbal warning).

In some embodiments, the auditory output system 506 may identify physical characteristics of the human being 514 and may reference a database to determine if the human being 514 poses a threat. For example, the auditory output system 506 may determine physical characteristics such as a height, weight, hair color, build, tattoos, facial features and so forth of the human being 514. The auditory output system 506 may compare the identified physical characteristics to suspicious person profiles (e.g., people from a public database of suspicious persons such as the FBI most wanted fugitives web page or a police web page), to determine whether the physical characteristics correspond to any one of the suspicious person profiles. If so, the third sound may be modified to include a unique warning (e.g., an intermittent loud beep with modified textures and/or verbal warning).

The auditory output system 506 may provide new audio stimuli to the user 502 at predetermined time intervals, and/or when the user 502 has traveled a predetermined distance. The auditory output system 506 may also include a dynamic update feature that provides a new audio stimuli to the user 502 to reflect a changing environment and/or movements of surrounding objects. For example, if the human being 514 begins to approach the human being 514 to reduce a distance between the user 502 and human being 514, the auditory output system 506 may provide an audio stimuli (e.g., the third sound modified to indicate shortening distance) to indicate as much. As another example, if the first rock 516 rolls away from or towards the user 502, the auditory output system 506 may provide an audio stimuli to reflect the change in distance between the first rock 516 and the user 502.

Figure 6:
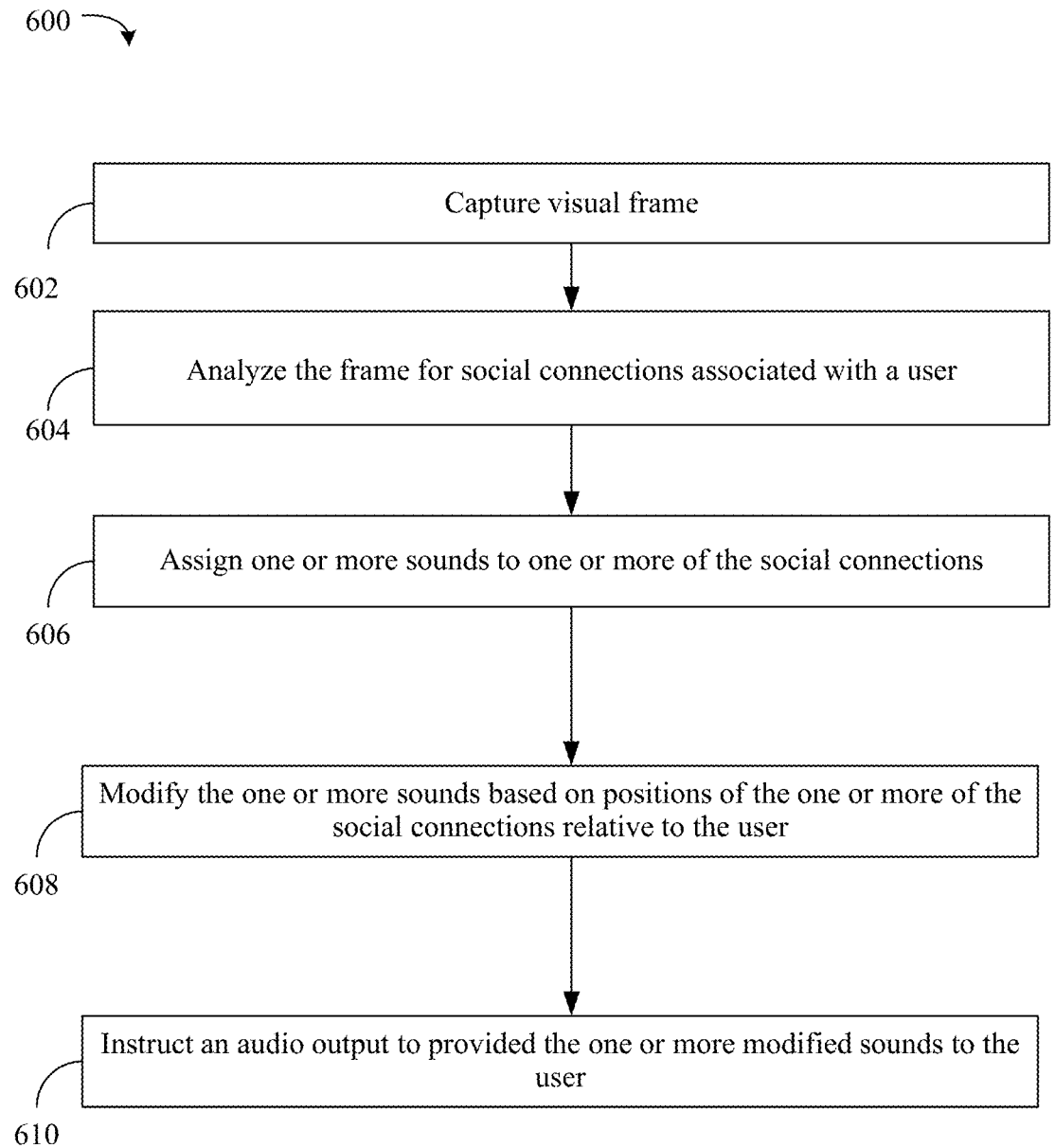
FIG. 6 illustrates a method to provide audio stimuli associated with social connections of a user according to some exemplary embodiments.

FIG. 6 illustrates a method 600 to provide audio stimuli associated with social connections of a user. The audio stimuli may be provided through an auditory output system. Processing block 602 may capture a visual frame. Processing block 604 may analyze the frame for social connections associated with a user. For example, processing block 604 may use image and/or visual recognition techniques to analyze the frame to recognize facial features. The facial features may be compared to images of faces within a social database. The database may be locally stored on the auditory output system and/or may be remotely stored. For example, the database may an on-line social platform (e.g., Face-Book™ or LinkedIn™). A user profile of the user may be connected to other profiles of the social connections (e.g., friends and/or colleagues) connected to the user. The other profiles may include images of the social connections of the user. The auditory output system may compare the recognized facial features to the images of the social connections to identify that the recognized facial features match one or more of the social images of the connections.

Processing block 606 may assign one or more sounds to one or more of the identified social connections. For example, one or more characteristics of a first sound may be modified based on a first identified social connection of the one or more identified social connections. In detail, the first identified social connection may be assigned a unique first sound texture that is only assigned to the first identified social connection. In some embodiments, the unique first sound texture is permanently and exclusively assigned to the first identified social connection so that the first sound texture is never used to identify anyone and/or anything else. Thus, when the first identified social connection is identified, the first sound may be assigned the first texture. Likewise, each identified social connection may be assigned a unique characteristic (e.g., texture) to facilitate the user's recognition of the social connections. As such, every time the first identified social connection is encountered, an associated sound with the first texture may be provided.

Processing block 608 may modify the one or more sounds based on positions of the one or more social connections relative to the user. For example, processing block 608 may modify the one or more sounds based on relative positions and a distance between each of the one or more identified social connections and the user. For example, the first sound may be assigned different characteristics based on the distance and relative position between the first identified social connection and the user. Processing block 610 may instruct an audio output to provide the one or more modified sounds to the user.

Figure 7:
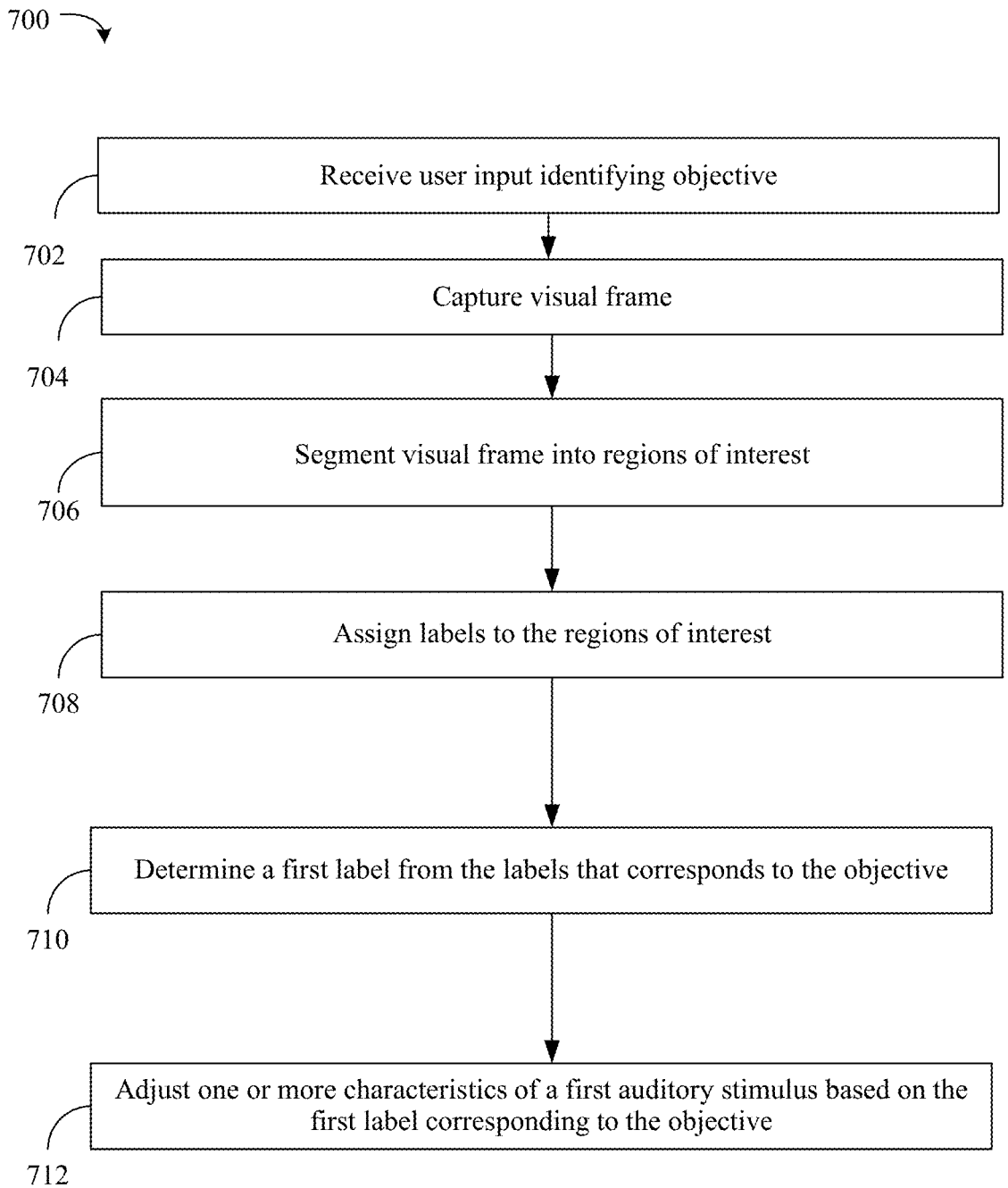
FIG. 7 illustrates a method to provide audio stimuli based on an objective according to some exemplary embodiments.

FIG. 7 illustrates a method 700 to provide audio stimuli based on an objective. The audio stimuli may be provided through an auditory output system. Processing block 702 may receive a user input identifying an objective. The objective may be an animal, human being, location and/or any object (e.g., wallet, keys, etc.) that the user is attempting to reach. Processing block 704 may capture a visual frame of the user's environment. Processing block 706 may segment the visual frame into regions of interest. Processing block 708 may assign labels to the regions of interest. The labels may identify the regions of interest and define a category for the regions of interest. For example, a first region of interest may be labelled as "keys," a second region of interest may be labeled as a "first social connection" of the user. In some embodiments, the labeling processing may include categorization as described herein.

Processing block 710 may determine a first label from the labels that corresponds to the objective. For example, processing block 710 may compare each of the labels to the objective to determine if a match occurs. In the present example, the first label from the labels matches or is the same as the objective. Thus, it may be inferred that the location of the objective is a particular region of interest that is assigned the first label.

Processing block 712 may adjust one or more characteristics of an auditory stimulus based on the first label corresponding to the objective. For example, processing block 712 may determine a first sound of the auditory stimulus is to represent the particular region of interest that corresponds to the first label. A unique sound texture may be assigned to the first sound to indicate that the objective is in the particular region of interest.

Figure 8:
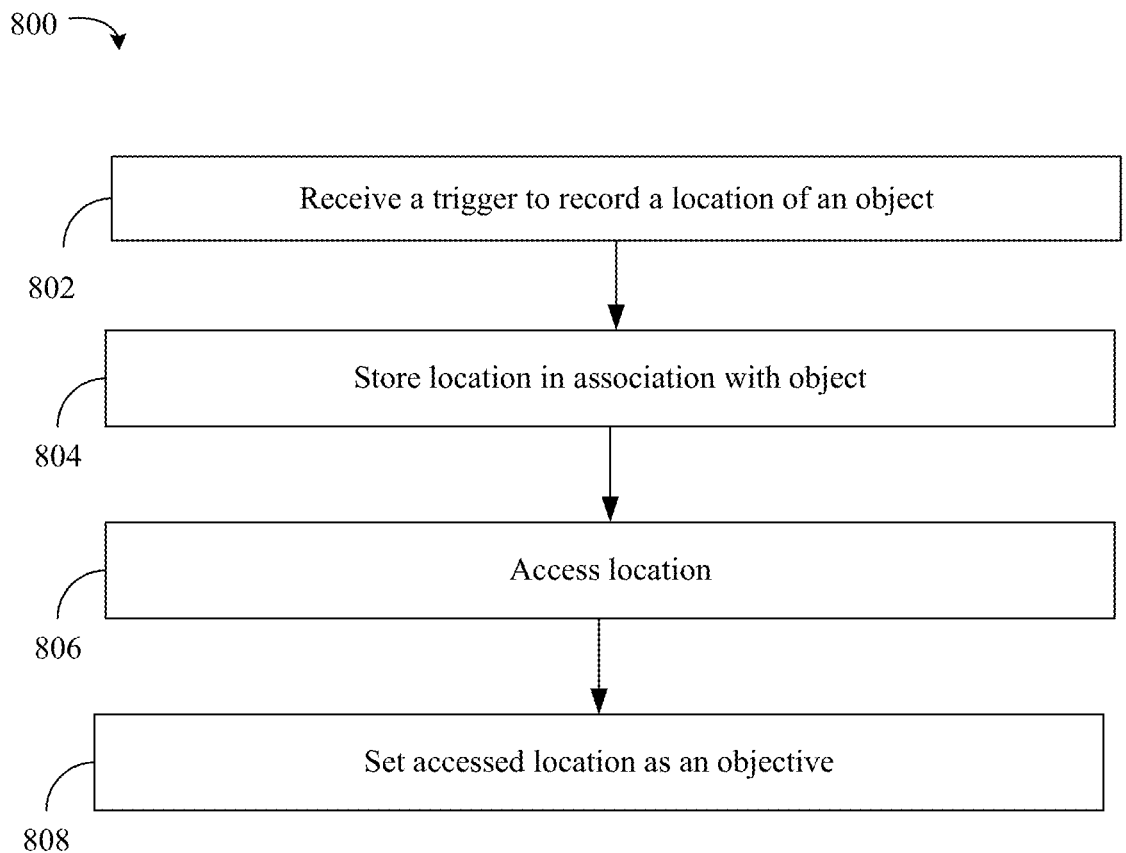
FIG. 8 illustrates a method to set an objective according to some exemplary embodiments.

FIG. 8 illustrates a method 800 to set an objective. Processing block 802, may receive a trigger to record a location of an object. For example, a user may manually provide an instruction to record the location. In some embodiments, processing block 802 may automatically store a location when a particular object is identified. As an example, processing block 802 may identify a number of times that the user utilizes an object (e.g., keys, wallet, glasses, etc.). If the number of times meets a threshold, then the processing block 802 may determine that a location of the object is to be recorded in association with the object each time the object is outside a radius of the user and/or out of direct control of the user. For example, processing block 802 may use image recognition to identify from a captured frame that the user is placing the object at the location.

Processing block 804 may store the location in association with the object. In some embodiments, a lookup table stores the location in association with the object. For example, a user may have placed eyeglasses at a first location. Therefore, the first location may be stored in association with eyeglasses. Doing so may facilitate key word searches for objects to determine a corresponding location of the object.

Processing block 806 may access the location. For example, block 806 may receive an input for the object. Block 806 may then identify the location based on the search for the object in the lookup table. As a detailed example, the user may request their eyeglasses. Processing block 806 may therefore execute a keyword search for eyeglasses in the lookup table. Once the eyeglasses are found in the lookup table, processing block 806 may then identify the associated location (e.g., the first location) of the eyeglass from the lookup table.

Processing block 808 may set the accessed location as an objective. The objective may be provided to the user as an audio stimulus.

Figure 9:
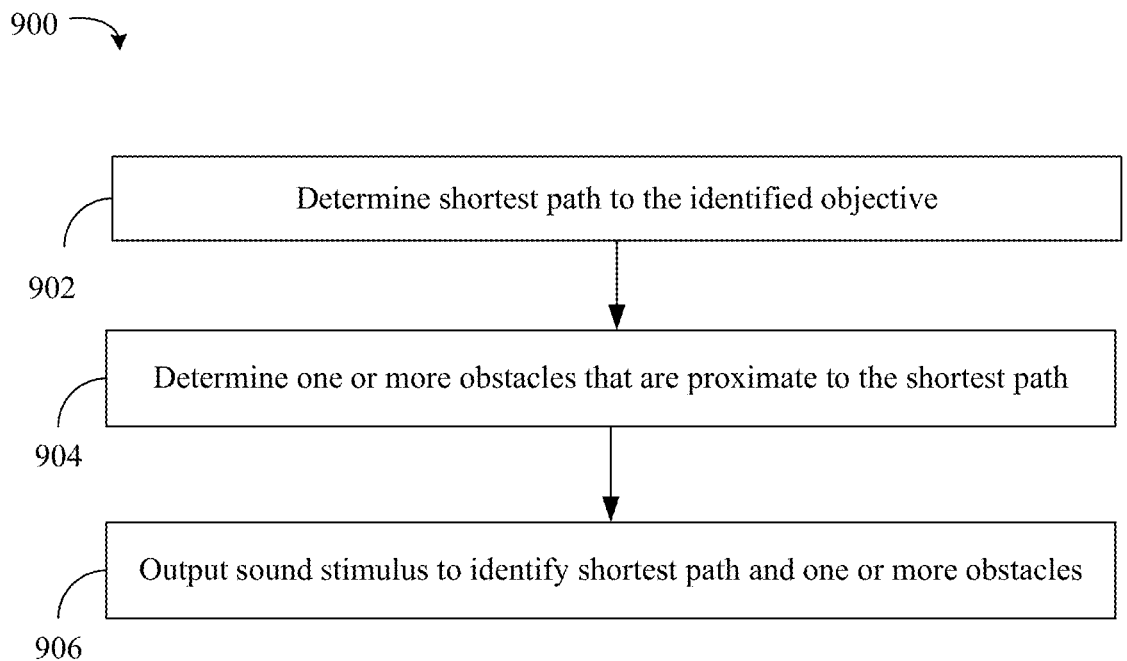
FIG. 9 illustrates a method to provide an audio stimulus to provide a shortest path to an objective according to some exemplary embodiments.

FIG. 9 illustrates a method 900 to provide audio stimulus to provide a shortest path to an objective. The location of the objective may be determined similarly to as described above. Processing block 902 may determine a shortest path to the identified objective. For example, processing block 902 may determine a shortest path to a position of the identified objective that is free of obstacles.

Processing block 904 determine one or more obstacles that are adjacent to the shortest path. For example, processing block 904 may determine that the one or more obstacles are outside of the shortest path, but are within a predetermined distance of the shortest path. That is, processing block 904 may determine a position for a region of interest, and determine that the position is within a predetermined distance of the shortest path (e.g., a future path of the user). For example, the shortest path may be free of obstacles. If however an obstacle is proximate to the shortest path, processing block 904 may determine that the user should nonetheless be aware of the obstacle in case the user deviates from the shortest path. Obstacles outside of the predetermined distance may be discarded.

Processing block 906 may output a sound stimulus to identify the shortest path and the one or more obstacles. Thus, the user may be able to comfortably navigate the shortest path and be aware of any potential obstacles that may be encountered if the user deviates from the shortest path.

Figure 10:
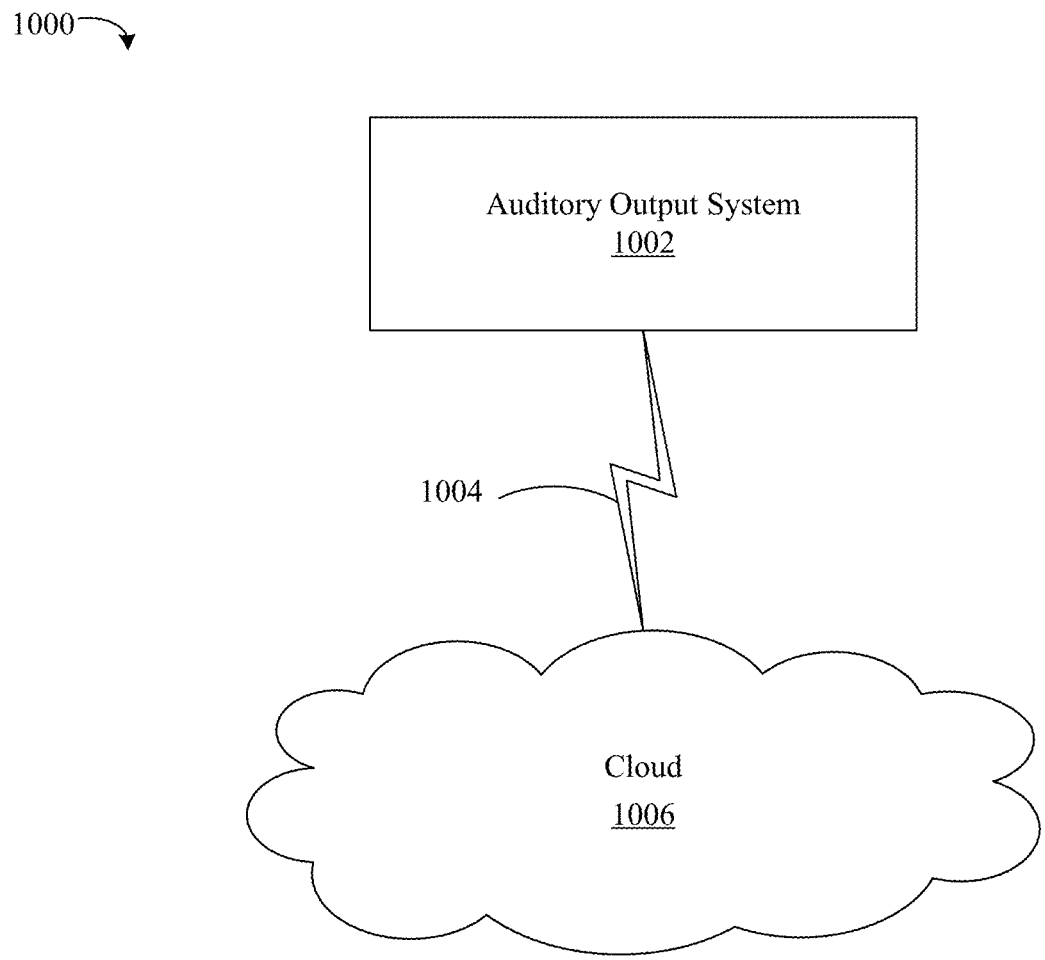
FIG. 10 illustrates an audio processing system.

FIG. 10 illustrates an audio processing system 1000. The system 1000 may include an auditory output system 1002. The auditory output system 1002 may communicate with a cloud 1006. The auditory output system 1002 may provide an image to the cloud 1006 through internet 1004. The cloud 1006 may execute some of the processes described herein to provide audio stimuli data to the auditory output system 1002. The auditory output system 1002 may provide audio stimuli based on the audio stimuli data to a user. The cloud 1006 may include one or more servers and be remote to the auditory output system.

The flowchart and block diagrams in the Figures illustrate the architecture, functionality, and operation of possible implementations of systems, methods and computer program products according to various exemplary embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The methods shown herein may generally be implemented in a computing device or system. The computing device or system may be a user level device or system or a server-level device or system. More particularly, the methods may be implemented in one or more modules as a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods and processes of any of the figures herein may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, and/or other structural components that are native to hardware (e.g., host processor, central processing unit/CPU, microcontroller, etc.).

Example sizes/models/values/ranges may have been given, although embodiments are not limited to the same. Where specific details are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An auditory output system, comprising:
a memory; and
a processor coupled to the memory, wherein the processor is configured to:
  receive a visual frame associated with an environment;
  segment the visual frame into a plurality of regions of interest;
  determine a first position for a first region of the plurality of regions of interest;
  conduct a determination that the first position intersects with a projected area associated with a user, wherein the projected area is to include one or more areas that are outside of a current direction of movement of the user; and
  select one or more characteristics of a first auditory stimulus based on the first position and the determination that the first position is within the projected area.

2. The system of claim 1, wherein the one or more characteristics of the first auditory stimulus include one or more of a pitch, a length, a volume, a position or a texture.

3. The system of claim 1, wherein the processor is configured to:
  determine a second position for a second region from the plurality of regions of interest; and
  select one or more characteristics of a second auditory stimulus based on the second position, wherein the second auditory stimulus is different from the first auditory stimulus.

4. The system of claim 3, wherein the processor is configured to:
  calculate a first distance, wherein the first distance is one or more of a distance between the first region and the user or a distance between the auditory output system and the first region;
  calculate a second distance, wherein the second distance is one or more of a distance between the second region and the user or a distance between the auditory output system and the second region;
  determine whether the second distance is greater than the first distance; and
  if the second distance is greater than the first distance, trigger the first auditory stimulus to be output before the second auditory stimulus.

5. The system of claim 1, wherein the processor is configured to:
generate a first label for the first region; and
select the one or more characteristics of the first auditory stimulus based on the first label.

6. The system of claim 5, wherein the processor is configured to:
receive a user input that indicates an objective;
determine whether the first label corresponds to the objective; and
select the one or more characteristics of the first auditory stimulus based on whether the first label corresponds to the objective.

7. The system of claim 1, wherein the processor is configured to:
determine a second position for a second region from the plurality of regions of interest;
receive a user input associated with an intended location;
map a future path between the intended location and a current location of the user;
conduct an identification that the second position is within a predetermined distance of the future path; and
select one or more characteristics of a second audio stimulus based on the future path and the identification.

8. A method, comprising:
receiving a visual frame associated with an environment;
segmenting the visual frame into a plurality of regions of interest;
determining a first position for a first region of the plurality of regions of interest;
conducting a determination that the first position intersects with a projected area associated with a user, wherein the projected area is to include one or more areas that are outside of a current direction of movement of the user; and
selecting one or more characteristics of a first auditory stimulus based on the first position and the determination that the first position is within the projected area.

9. The method of claim 8, wherein the one or more characteristics of the first auditory stimulus include one or more of a pitch, a length, a volume, a position or a texture.

10. The method of claim 8, further comprising:
determining a second position for a second region from the plurality of regions of interest; and
selecting one or more characteristics of a second auditory stimulus based on the second position, wherein the second auditory stimulus is different from the first auditory stimulus.

11. The method of claim 10, further comprising:
calculating a first distance, wherein the first distance is one or more of a distance between the first region and the user or a distance between an auditory output system and the first region;
calculating a second distance between the second region and the user, wherein the second distance is one or more of a distance between the second region and the user or a distance between the auditory output system and the second region;
determining whether the second distance is greater than the first distance; and
if the second distance is greater than the first distance, triggering the first auditory stimulus to be output before the second auditory stimulus.

12. The method of claim 8, further comprising:
generating a first label for the first region; and
selecting the one or more characteristics of the first auditory stimulus based on the first label.

13. The method of claim 12, further comprising
receiving a user input that indicates an objective;
determining whether the first label corresponds to the objective; and
selecting the one or more characteristics of the first auditory stimulus based on whether the first label corresponds to the objective.

14. A non-transitory computer readable medium comprising a set of instructions, which when executed by one or more processors of a device, cause the one or more processors to:
receive a visual frame associated with an environment;
segment the visual frame into a plurality of regions of interest;
determine a first position for a first region of the plurality of regions of interest;
conduct a determination that the first position intersects with a projected area associated with a user, wherein the projected area is to include one or more areas that are outside of a current direction of movement of the user; and
select one or more characteristics of a first auditory stimulus based on the first position and the determination that the first position is within the projected area.

15. The non-transitory computer readable medium of claim 14, wherein the one or more characteristics of the first auditory stimulus include one or more of a pitch, a length, a volume, a position or a texture.

16. The non-transitory computer readable medium of claim 14, wherein the set of instructions, which when executed by the one or more processors, cause the one or more processors to:
determine a second position for a second region from the plurality of regions of interest; and
select one or more characteristics of a second auditory stimulus based on the second position, wherein the second auditory stimulus is different from the first auditory stimulus.

17. The non-transitory computer readable medium of claim 16, wherein the set of instructions, which when executed by the one or more processors, cause the one or more processors to:
calculate a first distance, wherein the first distance is one or more of a distance between the first region and the user or a distance between an auditory output system and the first region;
calculate a second distance, wherein the second distance is one or more of a distance between the second region and the user or a distance between the auditory output system and the second region;
determine whether the second distance is greater than the first distance; and
if the second distance is greater than the first distance, trigger the first auditory stimulus to be output before the second auditory stimulus.

18. The non-transitory computer readable medium of claim 14, wherein the set of instructions, which when executed by the one or more processors, cause the one or more processors to:
generate a first label for the first region; and
select the one or more characteristics of the first auditory stimulus based on the first label.

19. The non-transitory computer readable medium of claim 18, wherein the set of instructions, which when executed by the one or more processors, cause the one or more processors to:
receive a user input that indicates an objective;

determine whether the first label corresponds to the objective; and select the one or more characteristics of the first auditory stimulus based on whether the first label corresponds to the objective.

20. The non-transitory computer readable medium of claim 14, wherein the set of instructions, which when executed by the one or more processors, cause the one or more processors to:

determine a second position for a second region from the plurality of regions of interest;

receive a user input associated with an intended location;

map a future path between the intended location and a current location of the user;

conduct an identification that the second position is within a predetermined distance of the future path; and select one or more characteristics of a second audio stimulus based on the future path and the identification.

* * * * *

UNITED STATES PATENT AND TRADEMARK OFFICE
CERTIFICATE OF CORRECTION

PATENT NO. : 10,997,828 B2  
APPLICATION NO. : 16/537199  
DATED : December 31, 2019  
INVENTOR(S) : Paulo Victor Moura and Leonardo Correia Silva It is certified that error appears in the above-identified patent and that said Letters Patent is hereby corrected as shown below:

In the Specification

At Column 9, Description of the Embodiments, Line number 40, delete "10" and insert --104-- therefor.

At Column 15, Description of the Embodiments, Line numbers 43-44, delete "Pitch Distortion=(1-Normalize(Distance To Agent)) *MaxPitch Distortion" and insert --PitchDistortion=(1-Normalize(DistanceToAgent))*MaxPitchDistortion-- therefor.

In the Claims

At Column 22, Claim 13, Line number 1, after "comprising", insert --:-- therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*